(12) United States Patent
Takahashi

(10) Patent No.: US 8,390,734 B2
(45) Date of Patent: Mar. 5, 2013

(54) DIGITAL IMAGE PROCESSING APPARATUS AND METHOD OF CONTROLLING THE DIGITAL IMAGE PROCESSING APPARATUS

(75) Inventor: Shinri Takahashi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 12/708,706

(22) Filed: Feb. 19, 2010

(65) Prior Publication Data
US 2010/0225801 A1 Sep. 9, 2010

(30) Foreign Application Priority Data
Mar. 9, 2009 (KR) ........................ 10-2009-0019858

(51) Int. Cl.
*H04N 5/238* (2006.01)
(52) U.S. Cl. ..................................... 348/363; 348/221.1
(58) Field of Classification Search .................. None
See application file for complete search history.

(56) References Cited

U.S. PATENT DOCUMENTS

| | | | | |
|---|---|---|---|---|
| 7,030,911 | B1 * | 4/2006 | Kubo | 348/221.1 |
| 7,525,590 | B2 * | 4/2009 | Murata et al. | 348/352 |
| 8,130,278 | B2 * | 3/2012 | Border et al. | 348/208.6 |
| 2006/0170816 | A1 * | 8/2006 | Silverstein et al. | 348/362 |
| 2008/0024619 | A1 * | 1/2008 | Ono | 348/222.1 |

* cited by examiner

*Primary Examiner* — Chieh M Fan
*Assistant Examiner* — Wesley J Chiu
(74) *Attorney, Agent, or Firm* — Drinker Biddle & Reath LLP

(57) ABSTRACT

A digital image processing apparatus that detects a moving object included in an input image, establishes a shutter speed according to an amount of movement of the moving object, and performs a capturing operation based on the established shutter speed, and a method of controlling the digital image processing apparatus are provided. The method includes: receiving an input image; detecting a moving object in the input image; measuring an amount of movement of the moving object; and establishing a shutter time for a capturing operation according to the amount of movement of the moving object and according to at least one of: an established file size of an image to be captured or an established image size of the image to be captured.

17 Claims, 6 Drawing Sheets

| RECORDING PIXEL NUMBER | | COMPENSATION COEFFICIENT |
|---|---|---|
| 10M(4:3) | 3648 X 2736 | 1.000 |
| 9M(3:2) | 3648 X 2432 | 1.000 |
| 7M(16:9) | 3584 X 2016 | 1.017 |
| 7M(4:3) | 3072 X 2304 | 1.188 |
| 5M(4:3) | 2592 X 1944 | 1.407 |
| 3M(4:3) | 2048 X 1536 | 1.781 |
| 1M(4:3) | 1024 X 768 | 3.562 |

DIGITAL IMAGE PROCESSING APPARATUS AND METHOD OF CONTROLLING THE DIGITAL IMAGE PROCESSING APPARATUS

CROSS-REFERENCE TO RELATED PATENT APPLICATION

This application claims the benefit of Korean Patent Application No. 10-2009-0019858, filed on Mar. 9, 2009, in the Korean Intellectual Property Office, the entire contents of which is incorporated herein by reference.

BACKGROUND OF THE INVENTION

1. Field of the Invention

The present invention relates to a digital image processing apparatus and a method of controlling the digital image processing apparatus, and more particularly, to a digital image processing apparatus that performs a capturing operation by establishing a shutter speed, sensitivity, etc. according to a capturing status regarding a subject to be captured, and a method of controlling the digital image processing apparatus.

2. Description of the Related Art

Digital image processing apparatuses include apparatuses which process images or use image recognition sensors, for example, digital cameras, personal digital assistants (PDAs), phone cameras, or PC cameras.

A digital image processing apparatus may perform image processing and compression on an image captured by an imaging device by using a digital signal processor (DSP), so as to generate an image file, and may store the image file in memory.

Also, the digital image processing apparatus may display an image captured by the imaging device or an image contained in an image file stored in a storage medium, on a display device such as a liquid crystal display (LCD) device.

Furthermore, the digital image processing apparatus may detect a capturing status of a subject and automatically establish the shooting conditions, including a shutter speed, sensitivity, and the like, which are suitable for the capturing status, so as to capture an image of the subject. The better the image quality of the automatically captured images, the higher the value of the images to the user, and the higher the value of the digital image processing device to the user.

SUMMARY OF THE INVENTION

The present invention provides a digital image processing apparatus that detects a moving object included in an input image, establishes a shutter speed according to an amount of movement of the moving object, and performs a capturing operation based on the established shutter speed, and a method of controlling the digital image processing apparatus.

According to an aspect of the present invention, there is provided a method of controlling a digital image processing apparatus, the method including: receiving an input image; detecting a moving object in the input image; measuring an amount of movement of the moving object; and establishing a shutter time for a capturing operation according to the amount of movement of the moving object and according to at least one of an established file size of an image to be captured or an established image size of the image to be captured.

The moving object may be detected by sequentially receiving two or more input images and comparing the two or more input images.

The amount of movement may be measured as a measurement moving pixel number corresponding to the number of pixels by which the moving object moves between the two or more input images.

The shutter time may be established to be inversely proportional to the measurement moving pixel number.

The shutter time may be established to be inversely proportional to at least one of the file size of the image to be captured or the image size of the image to be captured.

The file size or the image size may be defined as a recording pixel number of a captured and stored image.

The received input image may have a size of the recording pixel number, and the shutter time is established according to an equation "shutter time=(allowable moving pixel number/measurement moving pixel number)×measured gap," wherein the measured gap is the time between capturing input images, and the allowable moving pixel is a number of the pixel that the moving object may move during the shutter time.

The received input image may have a size suitable for displaying a live view.

The shutter time may be established according to an equation "shutter time=(allowable moving pixel number/measurement moving pixel number)×measured gap×compensation coefficient," wherein the measured gap is a time between capturing input images, the allowable moving pixel is a number of the pixel that the moving object may move during the shutter time, and wherein compensation coefficient is a constant based on the image size of the image to be captured.

The file size or the image size may be defined as a recording pixel number of a captured and stored image, and the compensation coefficient is established to be inversely proportional to the recording pixel number.

The method may include establishing sensitivity to be inversely proportional to the shutter time.

According to another aspect of the present invention, there is provided a digital image processing apparatus including: an image input unit receiving an input image; a control unit detecting a moving object from the input image, measuring an amount of movement of the moving object, and establishing a shutter time during a capturing operation according to the amount of movement of the moving object and an established file size of a captured image or an established image size of the captured image; and a shutter operating unit operating during the shutter time when a capturing operation is performed.

The shutter operating unit may include: a shutter and a shutter driving unit operating to open the shutter during the shutter time.

The moving object may be detected by sequentially receiving two or more input images and comparing the two or more input images.

The amount of movement may be measured as a measurement moving pixel number corresponding to a pixel number by which the moving object moves in the input image.

The shutter time may be established to be inversely proportional to the measurement moving pixel number.

The shutter time may be established to be inversely proportional to the file size or the image size.

The file size or the image size may be defined as a recording pixel number of a captured and stored image.

The received input image may have a size of the recording pixel number, and the shutter time is established according to an equation "shutter time=(allowable moving pixel number/measurement moving pixel number)×measured gap".

The shutter time may be established according to an equation "shutter time=(allowable moving pixel number/measurement moving pixel number)×measured gap×compensation coefficient".

The file size or the image size may be defined as a recording pixel number of a captured and stored image, and the compensation coefficient is established to be inversely proportional to the recording pixel number.

Sensitivity may be established to be inversely proportional to the shutter time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
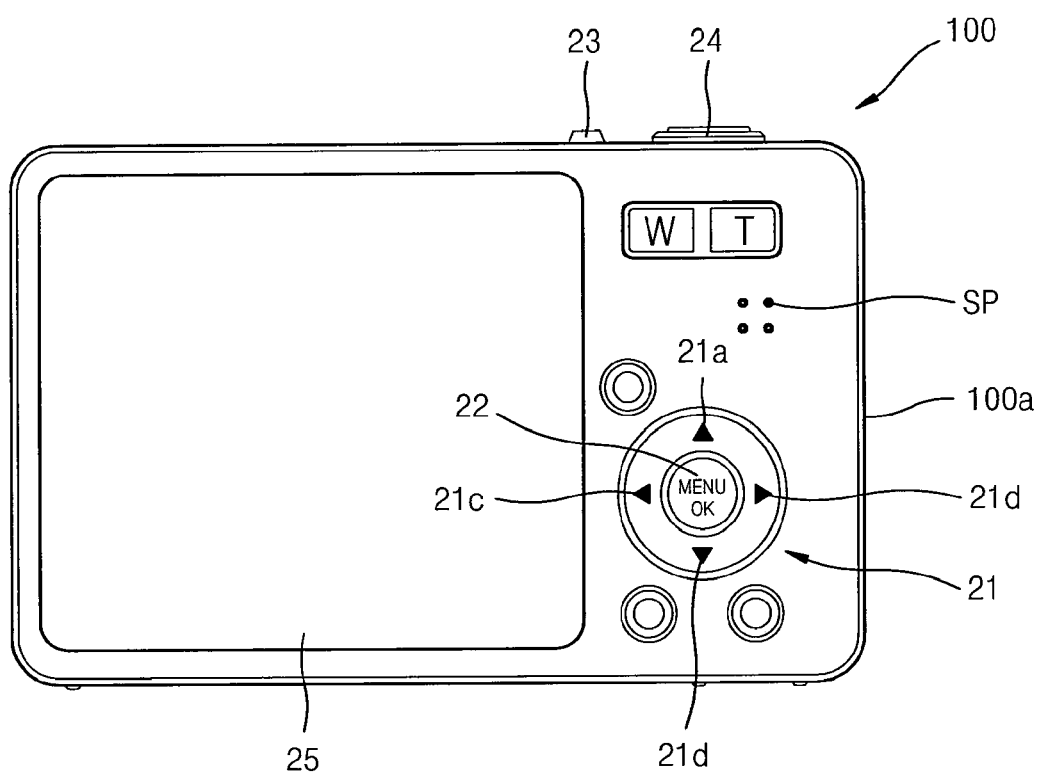
FIG. 1 is a rear view of an example of a digital camera as an example of a digital image processing apparatus.

FIG. 1 is a rear view of an example of a digital camera 100 as an example of a digital image processing apparatus.

Referring to FIG. 1, a direction button 21, a menu-OK button 22, a wide-zoom button W, a telephoto-zoom button T, and a display panel 25 may be disposed on a rear surface of the digital camera 100.

The direction button 21 may include a total of four buttons such as an up button 21A, a down button 21B, a left button 21C, and a right button 21D. The direction button 21 and the menu-OK button 22 are input keys for executing a variety of menu operations of the digital camera 100.

When the wide-zoom button W or the telephoto-zoom button T is pressed, a view angle is widened or narrowed. In particular, the wide-zoom button W or the telephoto-zoom button T may be used to change the size of a selected exposed area. In this case, if the wide-zoom button W is pressed, the size of the selected exposed area may increase, and if the telephoto-zoom button T is pressed, the size of the selected exposed area may decrease.

The display panel 25 may be a liquid crystal display (LCD). The display panel 25 may be included in a display unit (350 in FIG. 3) for displaying a live view of an input image. A speaker SP may output sound.

Additionally, a power switch 23, a shutter release button 24, a flash (not shown), and a lens unit (not shown) may be disposed on a front surface or a top surface of the digital camera 100.

The direction button 21, the menu-OK button 22, the power switch 23, and the shutter release button 24 may be included in a user manipulation unit (360 in FIG. 3) through which a user may input a desired manipulation signal from outside the digital camera 100.

The power switch 23 may be used to power on or off the digital camera 100. The shutter release button 24 opens or closes a shutter (221 in FIG. 2) in order to expose a film or an imaging device, such as a charge-coupled device (CCD), to light for a predetermined period of time, the length of which is established in the present embodiment.

A digital camera as an example of the digital image processing apparatus, and a control apparatus and method of controlling the digital camera are disclosed in US Patent Publication No. 20040130650 entitled "Method of automatically focusing a quadratic function in camera" and filed by the present applicant, which is hereby incorporated by reference.

The digital camera and the control apparatus and method of controlling the digital camera, which are disclosed in the above patent, are regarded as being included in the present application and thus detailed descriptions thereof will be omitted.

Figure 2:
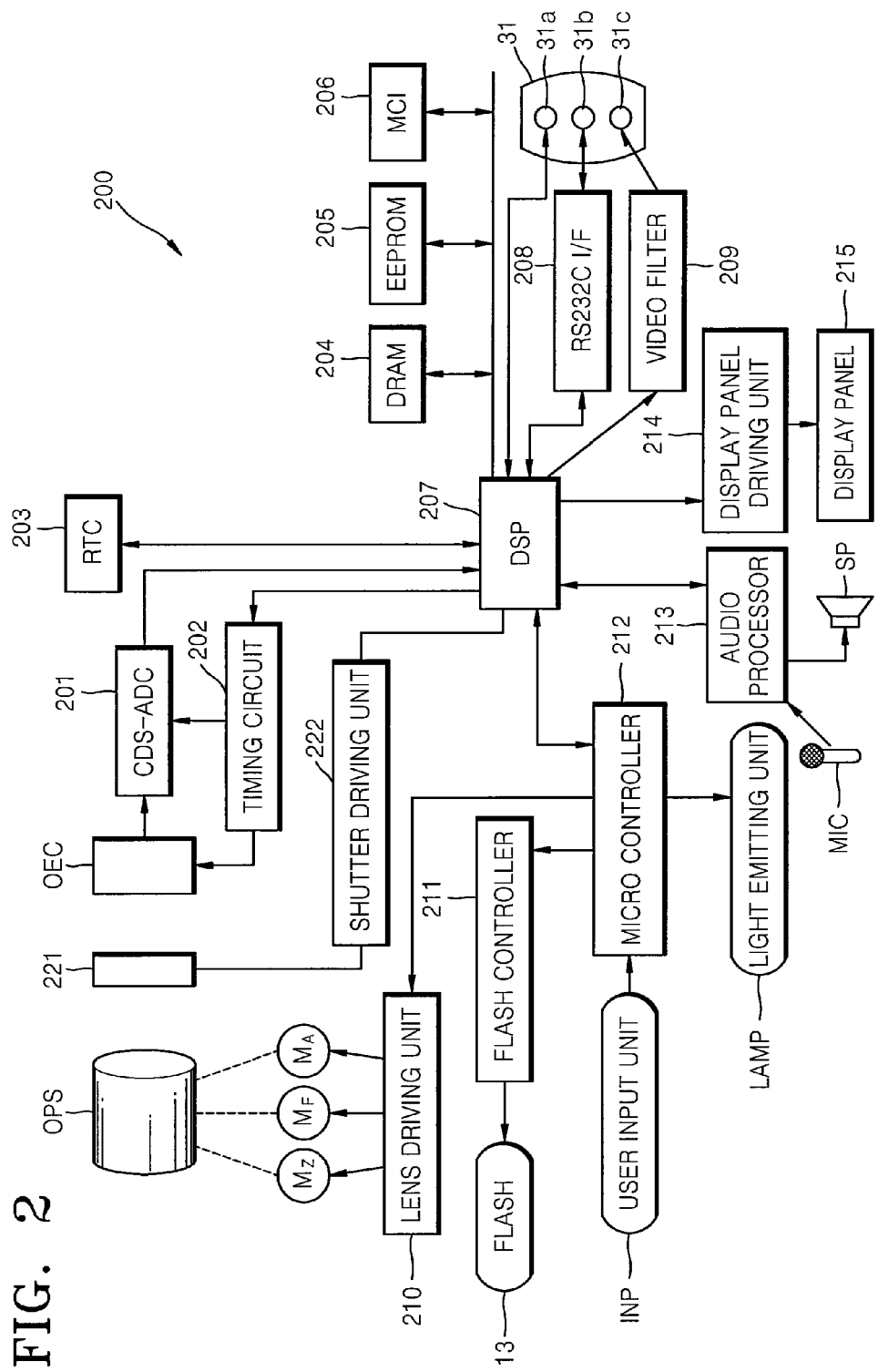
FIG. 2 is a block diagram of an example of a control apparatus included in the digital camera illustrated in FIG. 1.

FIG. 2 is a block diagram of an example of a control apparatus 200 of a digital image processing apparatus. The control apparatus 200 may be included in the digital camera 100 illustrated in FIG. 1 and thus FIG. 2 will be described in conjunction with FIG. 1.

Referring to FIG. 2, an optical system OPS, including a lens unit and a filter unit, optically processes light from a subject. The lens unit of the optical system OPS includes a zoom lens, a focus lens, and a compensation lens. If a user presses the wide-zoom button W or the telephoto-zoom button T included in a user input unit INP, a corresponding signal is input to a microcontroller 212.

Accordingly, the microcontroller 212 controls a lens driving unit 210 to drive a zoom motor $M_Z$, thereby moving the zoom lens. In more detail, if the wide-zoom button W is pressed, a focal length of the zoom lens is reduced and thus the lens moves so that a view angle is widened, and if the telephoto-zoom button T is pressed, the focal length of the zoom lens is increased and thus the lens moves so that the view angle is narrowed.

The compensation lens compensates for an overall refractive index and thus is not separately driven. Also, an aperture motor $M_A$ drives an aperture (not shown).

In the filter unit of the optical system OPS, an optical low pass filter removes optical noise of a high frequency component. An infrared cut filter cuts off an infrared component of incident light.

A photoelectric conversion unit OEC may include an imaging device such as a CCD and a complementary metal-oxide-semiconductor (CMOS) device. The photoelectric conversion unit OEC converts light received from the optical system OPS into an analog electric signal.

An analog-digital conversion unit may include a correlation double sampler and analog-to-digital converter (CDS-ADC) device 201. The analog-digital conversion unit processes an analog signal received from the photoelectric conversion unit OEC to remove high frequency noise from and to adjust the amplitude of the analog signal, and then, converts the analog signal into a digital signal. In this case, the DSP 207 controls a timing circuit 202 to control operations of the photoelectric conversion unit OEC and the analog-digital conversion unit.

Figure 3:
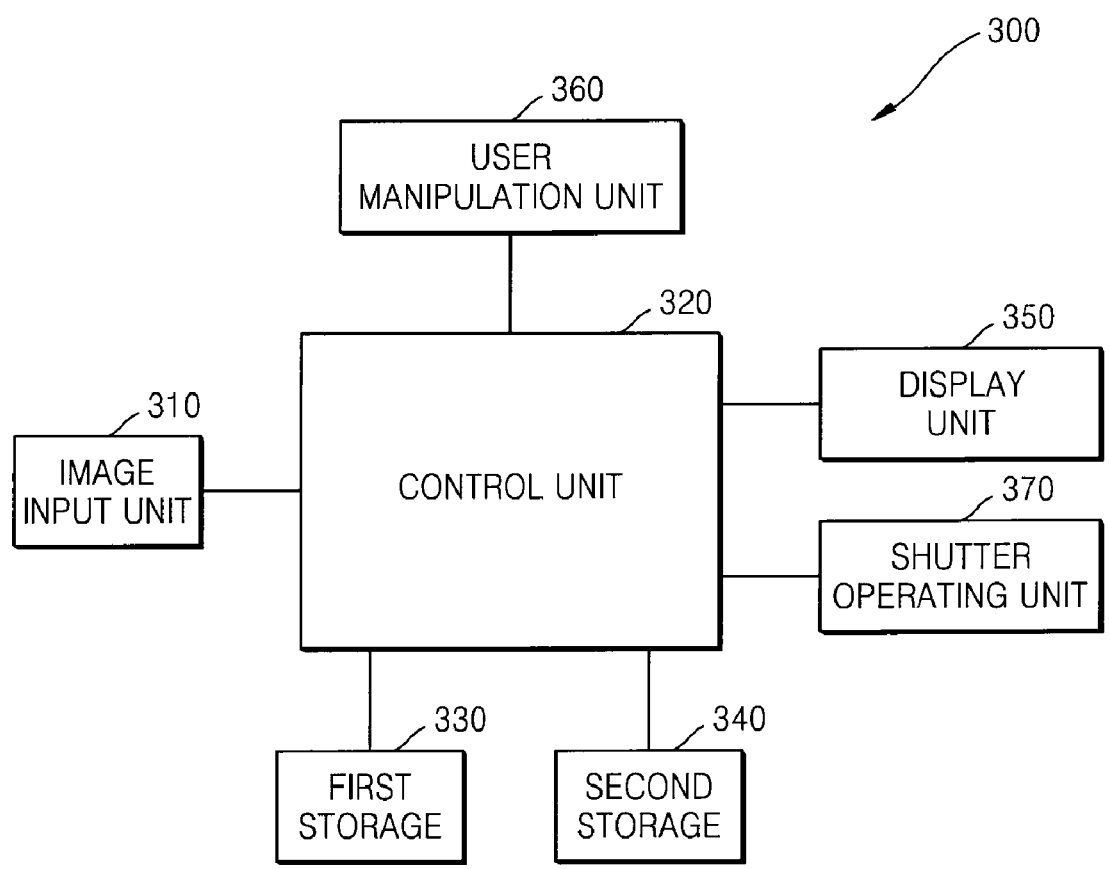
FIG. 3 is a block diagram of an example of a digital image processing apparatus.

The optical system OPS, the photoelectric conversion unit OEC, and the CDS-ADC device 201 may be included in an image input unit (310 in FIG. 3).

A real-time clock (RTC) 203 provides time information to the DSP 207. The DSP 207 processes the digital signal received from the CDS-ADC device 201 to generate a digital image signal defined by a luminance (Y) signal and chromaticity (R, G, B) signals.

A light emitting unit LAMP driven by the microcontroller 212 that is controlled by the main controller included in the DSP 207 may include a self-timer lamp, an auto-focusing lamp, a mode indication lamp, and a flash standby lamp.

The user input unit INP may include the direction button 21, the wide-zoom button W, and the telephoto-zoom button T. Also, the user input unit INP may be included in a user manipulation unit (360 in FIG. 3).

A dynamic random access memory (DRAM) 204 temporarily stores the digital image signal received from the DSP 207. An electrically erasable and programmable read only memory (EEPROM) 205 stores setting data and algorithms such as a booting program and a key input program which are required to operate the DSP 207. A memory card of the user may be attached to or detached from a memory card interface (MCI) 206.

The DSP 207 and/or the microcontroller 212 may be included in a control unit (320 in FIG. 3).

Also, the DSP 207 and/or the microcontroller 212 may include a cache memory as a temporary storage. In this case, the cache memory and the DRAM 204 may be included in a first storage (330 in FIG. 3) for temporarily storing an input image, shutter time, sensitivity, etc. The cache memory included in the first storage may be separated from the DSP 207 and/or the microcontroller 212.

The memory card, which is recognized via the memory card interface (MCI) 206, is a non-volatile memory for storing a captured image, and may be included in a second storage (340 in FIG. 3). The second storage 340 may include the EEPROM 205 which stores values, such as an allowable moving pixel number, a measurement gap, and a compensation coefficient in a non-volatile manner. An explanation of the values will be described later in detail.

The digital image signal received from the DSP 207 is input to a display panel driving unit 214 that drives a display panel 215 to display an image on the display panel 215.

The control apparatus 200 may further include a display unit including the display panel 215 and the display panel driving unit 214 for driving the display panel 215. The display panel driving unit 214 and the display panel 215 may be included in a display unit (350 in FIG. 3).

Additionally, the digital image signal received from the DSP 207 may be transmitted as a serial communication signal through a universal serial bus (USB) connection unit 31A or an RS232C interface 208 and its connection unit 31B, or may be transmitted as a video signal through a video filter 209 and a video output unit 31C. Here, the DSP 207 may include the microcontroller 212.

An audio processor 213 outputs a voice signal received from a microphone MIC to the DSP 207 or a speaker SP and an audio signal received from the DSP 207 to the speaker SP.

The shutter 221 is opened or shut so as to expose a film or an imaging device, CCD, to light for a predetermined period of time established in the present embodiment during a capturing operation. A shutter driving unit 222 operates to open the shutter 221 during the predetermined period of time during the capturing operation.

FIG. 3 is a block diagram of an example of a digital image processing apparatus 300. The digital image processing apparatus 300 may be controlled by a control method (S400 in FIG. 4) to be described later.

Referring to FIG. 3, the digital image processing apparatus 300 may include an image input unit 310, a control unit 320, first and second storages 330 and 340, a display unit 350, a user manipulation unit 360, and a shutter operating unit 370.

The image input unit 310 receives an input image. The control unit 320 detects a moving object from the input image, measures an amount of movement of the moving object, and establishes a shutter time according to the amount of movement of the moving object and an established file size of a captured image or an established image size thereof during the capturing operation. The shutter operating unit 370 operates during the shutter time during the capturing operation.

In this regard, the shutter operating unit 370 may include the shutter 221 and the shutter driving unit 222. The shutter 221 may be opened or shut in order to expose a film or an imaging device, such as a CCD, to light for an established period of time during a capturing operation. The shutter driving unit 222 may operate to open the shutter 221 during the shutter time during the capturing operation.

If a user half-presses the shutter release button 24 and a first signal S1 is input, an image that is input through a lens may be incident on the imaging device, such as the CCD, by opening the shutter 221 during the established shutter time.

In this regard, the digital image processing apparatus 300 may establish the shutter time according to the establishment of a shutter speed. Sensitivity may be automatically established in synchronization with the shutter speed. That is, if the shutter speed is slow (if the shutter time is long), a reduction in the sensitivity may result in the receiving of a sufficient amount of light.

If the shutter speed is fast (if the shutter time is short), an increase in the sensitivity may result in the receiving of a sufficient amount of light during a short period of time. In this case, a capturing operation at high sensitivity may cause an increase in noise.

The example of a digital image processing apparatus 300 detects the moving object from the input image, measures the amount of movement of the moving object, and establishes a shutter time to capture an image according to the amount of movement of the moving object and the established file size of the image to be captured or the established image size of the image to be captured.

The shutter time to be used to capture an image may be determined to be small enough to reduce a shake in the image due to the moving object and yet large enough so that the International Organization for Standardization (ISO) sensitivity may be lessened by not making the shutter time larger than it needs to be to reduce the shake. Since an increase in sensitivity increases the noise, an image having little or no shake from the moving object may be captured and the noise generated from the sensitivity may be reduced. In an embodiment, the shutter time may be determined to be the maximum amount of time that still prevents shake in the image due to the moving object. This maximum amount will minimize the amount of noise generated by increasing the sensitivity and yet still reducing the shake due to the moving object.

The image input unit 310 may continuously receive two frame images as the input image. For example, when the input image is input at 30 frames per second (fps), two frame images may be continuously received at an interval of 1/30 second.

The continuously received input image may be displayed on the display panel 25 (FIG. 1) as a live view. The input image used for calculating whether or not there is a moving object and the amount of movement of the moving object may have a pixel size for displaying the live view of the input image, that is different from a recording pixel number that is established to capture and store an image.

Figure 7:
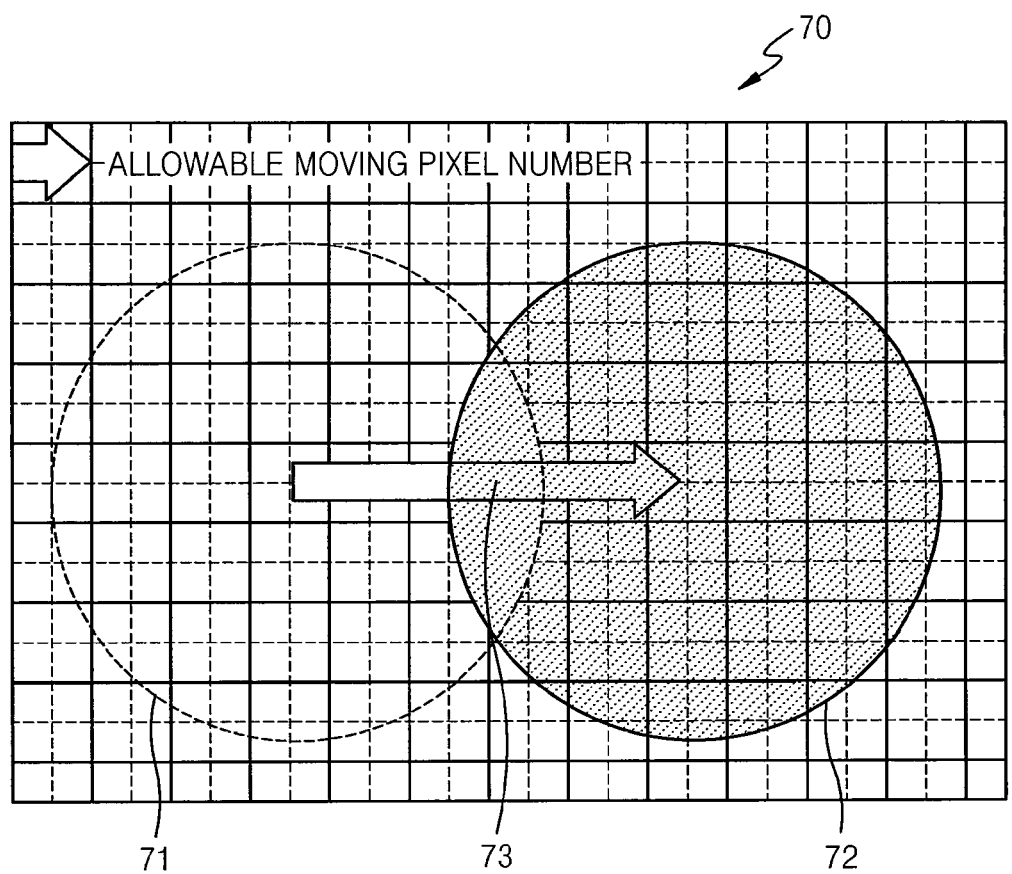
FIG. 7 is a schematic diagram of an example of a measurement moving pixel number measured with regard to a moving object in an input image when a recording pixel number is established as ¼ of a full pixel in the method of controlling the digital image processing apparatus shown in FIG. 4.

Moving objects may be detected by determining a difference between the continuously input two frame images. The amount of movement of the moving object may be measured by comparing the position of the moving objects in the two frame images. The amount of movement of the moving object may be measured as a measurement moving pixel number corresponding to the number of pixels by which the moving object moved from one frame image to the next frame image. Measurements of the amount of movement are shown in FIGS. 6 and 7.

Moving objects 61 and 62 or 71 and 72 may be detected from two different frame images (for example, moving object 61 may be in a first frame image and moving object 62 may be in a second frame image), and a distance between the centers of the moving objects 61 and 62 or 71 and 72 may be measured as measurement moving pixel number 63 or 73 respectively.

Figures 5, 6:
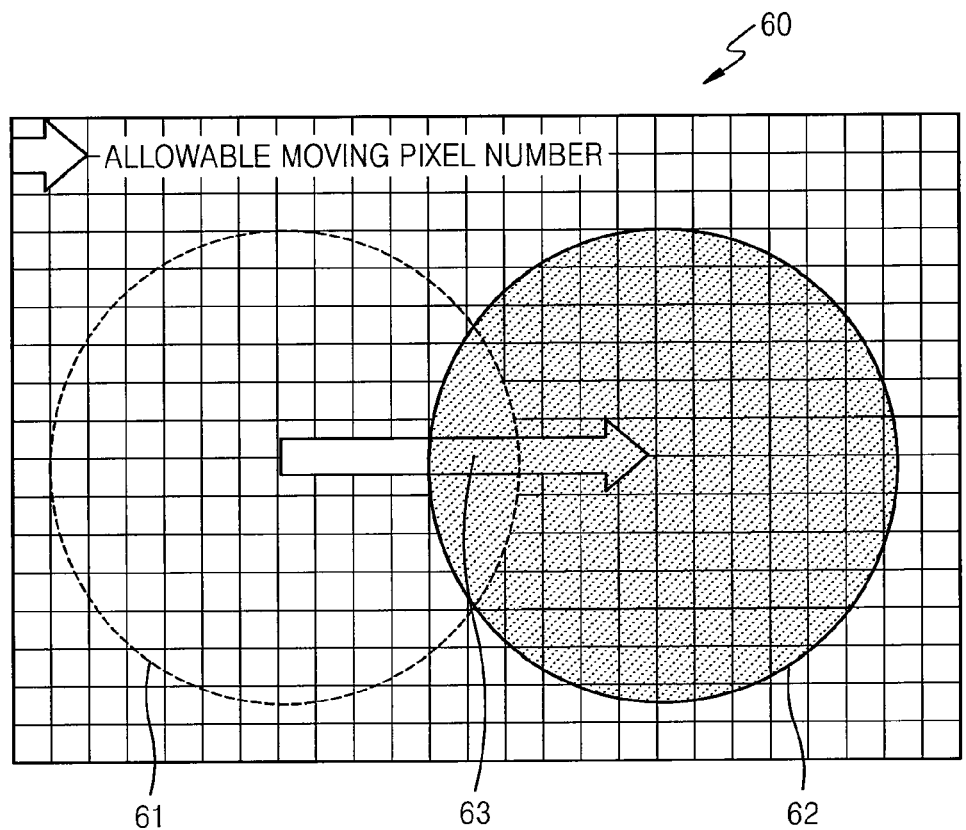
FIG. 5 is a table showing examples of compensation coefficients with respect to recording pixel numbers for use in the method of controlling the digital image processing apparatus shown in FIG. 4.
FIG. 6 is a schematic diagram of an example of a measurement moving pixel number measured with regard to a moving object in an input image when a recording pixel number is established as a full pixel in the method of controlling the digital image processing apparatus shown in FIG. 4.

The measurement moving pixel number may be 10 pixels in FIG. 6 in which the recording pixel number is established as a full pixel. The measurement moving pixel number may be 5 in the embodiment described with reference to FIG. 7 in which the recording pixel number is established as ¼ of the full pixel. So, in FIG. 7, 4 pixels will be recorded as one pixel. With regard to the input image that is the same as an image shown in FIG. 6, when the recording pixel number is reduced to ¼, the measurement moving pixel number is reduced by ½ to 5.

Therefore, the shutter time to be used to capture an image, is determined based on the amount of movement of the moving objects and an established file size to be used for the image to be captured or an established image size to be used for the image to be captured. Additionally, the ISO sensitivity may be determined based on the shutter time. In this case, the ISO sensitivity may be inversely proportional to the shutter time.

If the amount of movement of the moving object increases, an image having no shake may be captured by reducing the shutter time. However, when the shutter time is reduced, a higher sensitivity may be needed to compensate for the reduced amount of light received in the imaging device due to the reduced shutter time. The higher sensitivity may increase noise in the image to be captured.

Therefore, the shutter time for capturing the image, may be calculated to be as long as possible to capture an image without shake caused by the moving object, so that a lower sensitivity may be used while still reducing or eliminating shake caused by the moving image.

Additionally, the shutter time may be established to be inversely proportional to the file size or the image size to be used for the captured image. The file size or the image size to be used for the captured image may be defined as a recording pixel number of a captured image.

Recording pixel numbers corresponding to sizes of images or sizes of files that store captured images of input images are listed in a table shown in FIG. 5. For example, if the size of the file and image is 10 Mbytes with a ratio of 4:3, the recording pixel number may be 3648×2736.

In this regard, the input image used for calculating the number of pixels the moving object moves may be a predetermined size. For example, the input image may be a live view image with a predetermined size. In this case, the number of pixels the moving object moves may be calculated from an image with a predetermined size irrespective of the number of pixels to use to record the image to be captured.

Since the size of a live view image is generally smaller than the size of an image to record, the movement of the object may be calculated more efficiently using a live view image. The shutter time may be inversely proportional to the size of the image to be recorded (or the number of pixels to use for the image to be recorded.) The shutter time may be calculated according to equation 1 below.

$$\text{Shutter time} = (\text{allowable moving pixel number}/\text{measurement moving pixel number}) \times \text{measured gap} \times \text{compensation coefficient}. \quad \text{Equation 1}$$

The compensation coefficient may be inversely proportional to the number of pixels to be used to record the image. For example, if the number of pixels to be used to record the image is increased, then the size of the compensation coefficient may be decreased. Also, if the number of pixels to be used to record the image of the captured image is decreased, then the size of the compensation coefficient may increase. The number of pixels to be used to record the image may be called the recording pixel number of the captured image. Compensation coefficients established according to the recording pixel number of the captured image are shown in FIG. 5.

The compensation coefficient may be determined according to the recording pixel number, thereby increasing the shutter time when the recording pixel number is decreased. Since the recording pixel number is decreased the shake that may be caused by a moving object is reduced so the shutter time can be increased. And, since the sensitivity may be reduced when the shutter time is increased, the noise may be reduced while capturing an image without a shake.

Additionally, the shutter time may be calculated based on the allowable moving pixel number. The allowable moving pixel number is an allowable shake limit. Since there is a limit to the amount of shake identified by the human eye, the shutter time increases according to the allowable moving pixel number, thereby reducing the sensitivity setting and reducing noise.

Alternatively, a sufficient shutter time may be achieved when the recording pixel number is reduced by adjusting the allowable moving pixel number without considering the compensation coefficient in equation 1.

Alternatively, if the input image has the size of the recording pixel number, then the shutter time may be established according to equation 2 below.

$$\text{Shutter time} = (\text{allowable moving pixel number}/\text{measurement moving pixel number}) \times \text{measured gap}. \quad \text{Equation 2}$$

The shutter time, the allowable moving pixel number, and the measured gap are calculated in the same manner as shown in equation 1. However, the shutter time is calculated from an input image having a recording pixel number which is the same as a recording pixel number of an image to be captured and stored, so there is no need to adjust the shutter time based on the recording pixel number with the compensation coefficient.

Referring to FIG. 7, if the recording pixel number is reduced, the measurement moving pixel number may be reduced with regard to the same amount of movement as shown in FIG. 6. Therefore, when the recording pixel number is reduced, the shutter time may increase while preventing an increase in the shake of an image of a moving subject to be captured, thereby reducing sensitivity by increasing the shutter time and reducing noise.

Referring back to FIG. 3, the image input unit 310 receives the input image from an external device. The image input unit 310 may include the optical system OPS, the photoelectric conversion unit OEC, and the CDS-ADC device 201 which are illustrated in FIG. 2.

The control unit 320 controls the image input unit 310, the first and second storages 330 and 340, the display unit 350, the user manipulation unit 360, and the shutter operating unit 370 to establish the shutter time and sensitivity so as to reduce a shake and noise of an image. The control unit 320 may include the DSP 207 and/or the microcontroller 212 which are illustrated in FIG. 2.

The first and second storages 330 and 340 may store the input image and the captured images. The first storage 330 may temporarily store the input image and established values such as the shutter time and the sensitivity. The second storage 340 may store the captured images and values such as the allowable moving pixel number, the measured gap, and the compensation coefficient as non-volatile values.

The display unit 350 may include the display panel 25 illustrated in FIG. 1 and/or the display panel driving unit 214 and the display panel 215 which are illustrated in FIG. 2.

A user may input a desired instruction through the user manipulation unit 360 from outside the digital image processing apparatus 300. The user manipulation unit 360 may include the direction button 21 and the menu-OK button 22 which are illustrated in FIG. 1 and/or the user input unit INP illustrated in FIG. 2.

The moving object included in the input image is detected, a shutter speed is established according to the amount of movement of the moving object, and a capturing operation is performed according to the established shutter speed, thereby capturing an image having reduced noise and shake.

Figure 4:
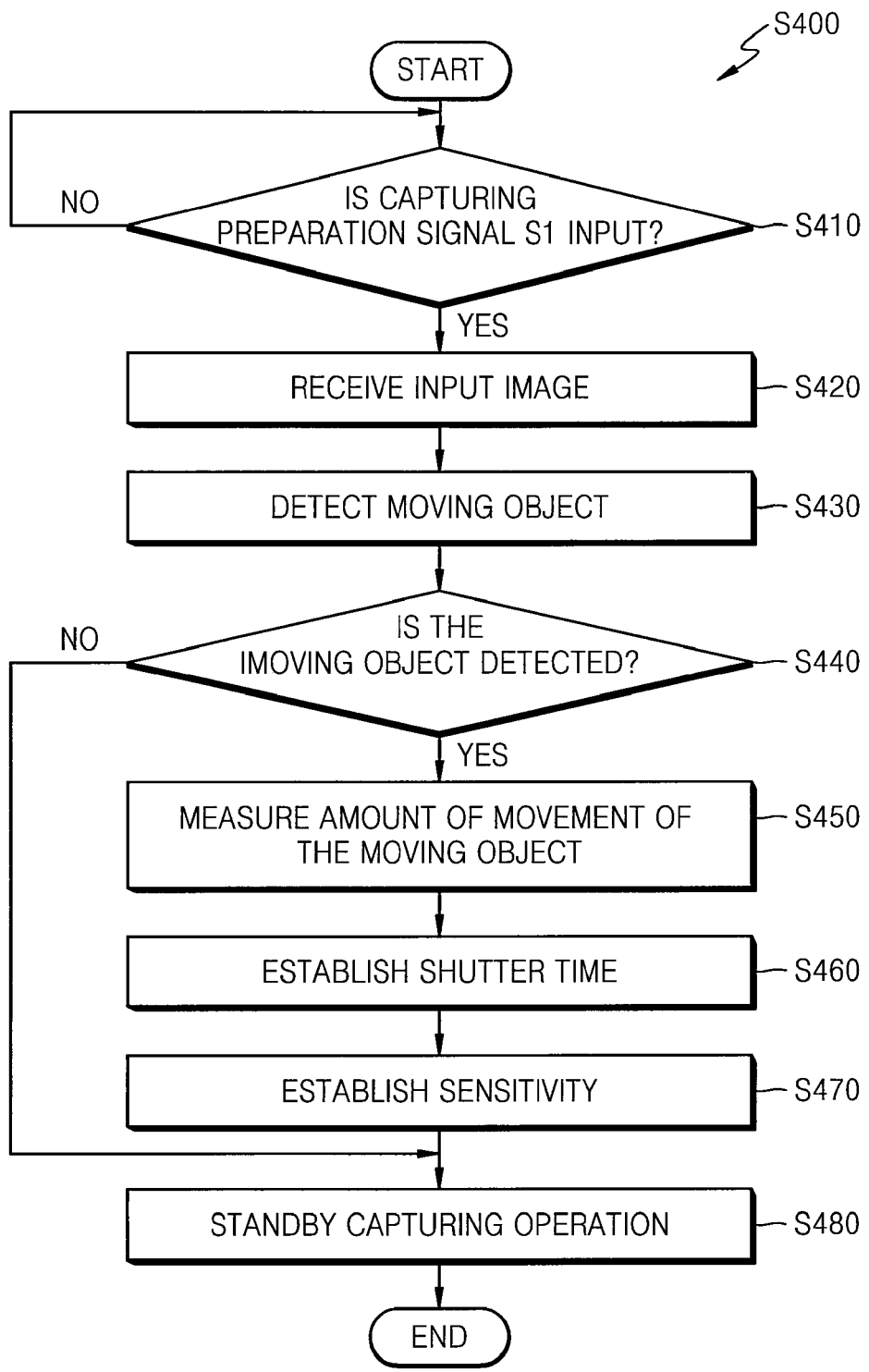
FIG. 4 is a flowchart of an example of a method of controlling a digital image processing apparatus.

FIG. 4 is a flowchart of an example of a method S400 of controlling a digital image processing apparatus. FIG. 5 is a table showing examples of compensation coefficients with respect to recording pixel numbers in the method of controlling the digital image processing apparatus shown in FIG. 4.

The method S400 may be performed by the control apparatus 200 illustrated in FIG. 2 and/or the digital image processing apparatus 300 illustrated in FIG. 3. For this, the method S400 may be a program or an algorithm that is stored in a storage unit illustrated in FIG. 2 or implemented in the form of a semiconductor chip such as firmware.

Thus, the above descriptions with reference to FIGS. 2 and 3 will not be repeated and may be omitted here.

Referring to FIG. 4, the method S400 may include receiving an input image in operation S410; detecting a moving object in operation S420; measuring an amount of movement of the moving object in operation S450; and establishing a shutter time in operations S460.

An input image is received in operation S410. A moving object is detected from the input image in operation S430. An amount of movement of the moving object is measured in operation S450. A shutter time during a capturing operation is established according to the amount of movement of the moving object and an established file size of a captured image or an established image size in operation S460.

If a manipulation of a shutter release button is input, an image that is input through a lens may be incident on an imaging device, such as a CCD, by opening a shutter during the established shutter time. The shutter time may be established according to the establishment of a shutter speed.

In particular, during a capturing operation in an automatic mode, the shutter time may be established according to a shooting condition or the input image. If the shutter speed is too slow, when the input image includes a moving object, an image including a shaking subject may be captured.

If the shutter speed is too fast, an image may be captured at high sensitivity so as to receive a sufficient amount of light during a short period of time, which may increase noise.

The method S400 of controlling the digital image processing apparatus of the present embodiment detects the moving object from the input image, measures the amount of movement of the moving object, and establishes the shutter time according to the amount of movement of the moving object and the established file size of the captured image or the established image size thereof during the capturing operation.

Therefore, the capturing operation is performed according to the established shutter time, thereby capturing an image having little or no shake from the moving object and reduced noise due to reducing the sensitivity needed by not making the shutter time longer than needed.

The method S400 of controlling the digital image processing apparatus may include inputting a first signal S1 in operation S410. The first signal S1 corresponding to a capturing preparation signal is input in operation S410. When it is determined that the first signal S1 is input, operation S420 may be performed.

In operation S420, two or more input images may be continuously received. In this regard, two continuously frame images may be input. For example, when the input image is received at 30 fps, two frame images may be continuously received at an interval of 1/30 second.

In this regard, the input image may be displayed on the display panel 25 (FIG. 1) as a live view. That is, the input image necessary for calculating the moving object and the amount of movement of the moving object may have a size for displaying the live view of the input image, irrespective of a recording pixel number that is established to capture and store an image.

Alternatively, the input image may have the same size as a captured and stored image. That is, the input image necessary for calculating the moving object and the amount of movement of the moving object may have a size corresponding to a recording pixel number that is established to capture and store an image.

Recording pixel numbers corresponding to sizes of files that store captured images of input images or sizes of images are listed in the table shown in FIG. 5. For example, if the size of the file and image is 10 Mbytes with a ratio of 4:3, the recording pixel number may be 3648×2736.

In operation S430, the moving object may be detected by comparing the two or more input images input in operation S420. The moving object may be detected by detecting a difference between the two continuously input frame images.

The method S400 of controlling the digital image processing apparatus may include determining whether the moving object is detected in operation S440. If it is determined that the moving object is detected, an amount of movement of the moving object operation may be measured in operation S450. Otherwise, a capturing standby operation may be performed in operation S480.

In operation S480, an input of a second signal S2, corresponding to a capturing resume signal, is waited for. When the second signal S2 is input, a capturing operation may be performed according to a variety of establishment values including the shutter time and sensitivity that are established in operations S460 and S470, respectively.

In operation S450, the amount of movement of the moving object is measured. In this regard, the amount of movement of the moving object may be measured as a measurement moving pixel number corresponding to the number of pixels by which the moving object moves in the input image. An example of the measurement of the amount of movement is shown in FIGS. 6 and 7.

Referring to FIG. 6, the measurement moving pixel number 63 is illustrated with regard to the moving objects 61 and 62 in the input image 60, when the recording pixel number is established as a full pixel in the method S400 of controlling the digital image processing apparatus.

Referring to FIG. 6, the moving objects 61 and 62 are detected from two different frame images, respectively, and a distance between the centers of the moving objects 61 and 62 may be measured as the measurement moving pixel number 63. In this regard, the measurement moving pixel number may be 10 pixels when the recording pixel number is established as the full pixel.

Referring to FIG. 7, the measurement moving pixel number 73 is illustrated with regard to the moving objects 71 and 72 in an input image which is the same as the input image 60 shown in FIG. 6, when the recording pixel number is established as ¼ of a full pixel in the method S400 of controlling the digital image processing apparatus.

Referring to FIG. 7, the moving objects 71 and 72 are detected from two different frame images, respectively, and a distance between the centers of the moving objects 71 and 72 may be measured as the measurement moving pixel number 73.

In this regard, the measurement moving pixel number may be 5 when the recording pixel number is established as ¼ of the full pixel. That is, with regard to the same input image as the input image 60 shown in FIG. 6, when the recording pixel number is reduced to ¼, the measurement moving pixel number is reduced by ½ to 5.

Referring back to FIG. 4, in operation S460, the shutter time is established during a capturing operation according to the amount of movement of the moving objects, an established file size of a captured image or an established image size thereof. The method S400 of controlling the digital image processing apparatus may include establishing sensitivity in operation S470.

In operation S470, the shutter time may be established according to the shutter time established in operation S460. Thereafter, operation S480 may be performed after the shutter time and the sensitivity are established in operations S460 and S480, respectively. In this regard, the ISO sensitivity may be established to be inversely proportional to the shutter time.

In more detail, if the shutter time is short, an imaging device receives a sufficient amount of light by increasing the ISO sensitivity, and if the shutter time is long, the imaging device may receive a relatively small amount of light by reducing the ISO sensitivity. However, high ISO sensitivity may increase noise compared to low ISO sensitivity.

In this regard, the shutter time may be established to be inversely proportional to a measured amount of movement. The amount of movement is measured during a measurement gap which is a predetermined gap of time, and the measurement gap is established to be inversely proportional to the measured amount of movement, thereby capturing an image having reduced noise and shake regarding the moving object.

That is, if the amount of movement of the moving object increases, an image can be captured without a shake by reducing the shutter time. Since the shutter time is short, high ISO sensitivity may be established so as to receive a sufficient amount of light in the imaging device, which may increase noise.

Therefore, the longest shutter time for capturing the image without a shake is calculated, and the capturing operation is performed within the calculated longest shutter time. That is, an increase in the ISO sensitivity is minimized by achieving the longest shutter time for removing a shake, thereby performing the capturing operation at the lowest ISO sensitivity while minimizing a shake.

Meanwhile, the amount of movement of the moving object may be measured as a moving pixel number corresponding to a distance between moving objects in the two continuously input frame images shown in FIGS. 6 and 7.

In this regard, the two continuously input frame images may be received in a pixel unit during a predetermine gap of time. A moving pixel number corresponding to a difference between the position of the moving objects 61 and 71 in a previous frame image of a moving object detected in each of the two continuously input frame images and the position of the moving objects 62 and 72 in a next frame image may be measured. In this regard, the moving pixel number of the continuously input two frame images may be measured as the measurement moving pixel number corresponding to the amount of movement of the moving object.

In this regard, the shutter time may be established to be inversely proportional to the measurement moving pixel number. In more detail, if the measurement moving pixel number measured during the measurement gap corresponding to the predetermined gap of time is large, since the amount of movement of the moving object increases, the shutter time may be reduced so as to capture an image without a shake.

If the measurement moving pixel number measured during the measurement gap corresponding to the predetermined gap of time is reduced, since the amount of movement of the moving object is small, the shutter time may increase, resulting in a reduction in the ISO sensitivity and thus noise may be reduced.

Meanwhile, the shutter time may be established to be inversely proportional to the established file size or the established image size. The established file size or the established image size may be defined as a recording pixel number of a captured image. In this regard, the input image for calculating the measurement moving pixel number may have a predetermined size.

That is, the input image may be a live view image. In this case, the measurement moving pixel number may be calculated from an image having a predetermined size, irrespective of the recording pixel number of a captured image. Since the size of the live view image is generally smaller than the recording pixel number, the measurement moving pixel number may be efficiently calculated from the live view image within a shorter period of time than is calculated from the captured image.

In this case, the shutter time may be established to be inversely proportional to the recording pixel number corresponding to the file size of the captured image or the established image size. The shutter time may be established according to equation 1.

In this regard, the compensation coefficient may be inversely proportional to the recording pixel number. That is, if the recording pixel number of the captured image increases, the size of the compensation coefficient may be reduced. Also, if the recording pixel number of the captured image is reduced, the size of the compensation coefficient may be determined to increase.

Compensation coefficients established according to the recording pixel number of the captured image are shown in FIG. 5. For example, if the size of a file and image, which corresponds to a full pixel, is 10 Mbytes with a ratio of 4:3, the recording pixel number may be 3648×2736, and the compensation coefficient may be 1. If the size of a file and image is 1 Mbyte with a ratio of 4:3, the recording pixel number may be 1024×768, and the compensation coefficient may be 3.562.

Referring to FIG. 7, if the recording pixel number is reduced, the measurement moving pixel number with regard to an amount of movement of the same size my be reduced. That is, when the recording pixel number is established as ¼ of a full pixel, the measurement moving pixel number may be 5, whereas the measurement moving pixel number is measured as 10 when the recording pixel number is established as the full pixel. That is, with regard to the same input image as the input image 60 shown in FIG. 6, when the recording pixel number is reduced to ¼, the measurement moving pixel number is reduced by ½.

Therefore, when the recording pixel number is reduced, the shutter time may increase without increasing a shake of an image of a moving object to be captured. Thus, the ISO sensitivity is reduced, which reduces noise.

However, when the compensation coefficient is not used in equation 1, since the measurement moving pixel number is calculated from a live view image, irrespective of the recording pixel number of a captured image, the shutter time cannot increase when the recording pixel number is reduced.

Therefore, the compensation coefficient defined according to the recording pixel number is used in the present embodiment, thereby reducing noise while capturing an image having no shake.

Meanwhile, the shutter time may be calculated based on the allowable moving pixel number. The allowable moving pixel number is the maximum allowable amount of shake. Since there is a limit for an amount of shake recognized by the human eye, the shutter time increases according to the allowable moving pixel number, thereby preventing an increase in the sensitivity and reducing noise.

Alternatively, a sufficient shutter time may be achieved when the recording pixel number is reduced by adjusting the allowable moving pixel number without considering the compensation coefficient in equation 1.

Alternatively, the input image may have the size of the recording pixel number. In this case, the shutter time may be established according to equation 2. The shutter time, the allowable moving pixel number, and the measured gap are calculated in the same manner as shown in equation 1. However, the shutter time is calculated from an input image having the same recording pixel number as a recording pixel number of an image to be captured and stored.

Referring to FIG. 7, if the recording pixel number is reduced, the measurement moving pixel number may be reduced with regard to the same amount of movement as shown in FIG. 6. Therefore, when the recording pixel number is reduced, the shutter time may increase while preventing an increase in the shake of an image of a moving subject to be captured, thereby reducing sensitivity by the increase in the shutter time and reducing noise.

According to the present invention, a moving object is detected from an input image, a shutter speed is established according to an amount of movement of the moving object, and a capturing operation is performed according to the established shutter time, thereby capturing an image having reduced noise and shake.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital image processing apparatus, the method comprising:
  receiving an input image;
  detecting a moving object in the input image;
  measuring an amount of movement of the moving object; and
  establishing a shutter time for a capturing operation according to the amount of movement of the moving object and according to at least one of: an established file size of an image to be captured or an established image size of the image to be captured
  wherein the amount of movement is measured as a measurement moving pixel number corresponding to the number of pixels by which the moving object moves between the two or more input images,
  wherein the shutter time is established according to an equation "shutter time=(allowable moving pixel number/measurement moving pixel number)×measured gap×compensation coefficient," wherein the measured gap is the time between capturing input images, the allowable moving pixel is a number of pixels that the moving object may move during the shutter time, and wherein compensation coefficient is a constant based on the image size of the image to be captured.

2. The method of claim 1, wherein the moving object is detected by sequentially receiving two or more input images and comparing the two or more input images.

3. The method of claim 1, wherein the shutter time is established to be inversely proportional to the measurement moving pixel number.

4. The method of claim 1, wherein the shutter time is established to be inversely proportional to at least one of: the file size of the image to be captured or the image size of the image to be captured.

5. The method of claim 1, wherein the file size or the image size is defined as a recording pixel number of a captured and stored image.

6. The method of claim 1, wherein the received input image has a size suitable for displaying a live view.

7. A method of controlling a digital image processing apparatus, the method comprising:
  receiving an input image;
  detecting a moving object in the input image;
  measuring an amount of movement of the moving object; and
  establishing a shutter time for a capturing operation according to the amount of movement of the moving object and according to at least one of: an established file size of an image to be captured or an established image size of the image to be captured,
  wherein the moving object is detected by sequentially receiving two or more input images and comparing the two or more input images,
  wherein the amount of movement is measured as a measurement moving pixel number corresponding to the number of pixels by which the moving object moves between the two or more input images,
  wherein the received input image has a size suitable for displaying a live view,
  wherein the shutter time is established according to an equation "shutter time=(allowable moving pixel number/measurement moving pixel number)×measured gap×compensation coefficient," wherein the measured gap is the time between capturing input images, the allowable moving pixel is a number of pixels that the moving object may move during the shutter time, and wherein compensation coefficient is a constant based on the image size of the image to be captured.

8. The method of claim 7, wherein the file size or the image size is defined as a recording pixel number of a captured and stored image, and the compensation coefficient is established to be inversely proportional to the recording pixel number.

9. The method of claim 1, further comprising: establishing sensitivity to be inversely proportional to the shutter time.

10. A digital image processing apparatus comprising:
an image input unit receiving an input image;
a control unit detecting a moving object from the input image, measuring an amount of movement of the moving object, and establishing a shutter time during a capturing operation according to the amount of movement of the moving object and an established file size of a captured image or an established image size of the captured image; and
a shutter operating unit operating during the shutter time when a capturing operation is performed,
wherein the amount of movement is measured as a measurement moving pixel number corresponding to a pixel number by which the moving object moves in the input image, and
wherein the shutter time is established according to an equation "shutter time=(allowable moving pixel number/measurement moving pixel number)×measured gap×compensation coefficient," wherein the measured gap is the time between capturing input images, the allowable moving pixel is a number of pixels that the moving object may move during the shutter time, and wherein compensation coefficient is a constant based on the image size of the image to be captured.

11. The digital image processing apparatus of claim 10, wherein the shutter operating unit comprises: a shutter and a shutter driving unit operating to open the shutter during the shutter time.

12. The digital image processing apparatus of claim 10, wherein the moving object is detected by sequentially receiving two or more input images and comparing the two or more input images.

13. The digital image processing apparatus of claim 10, wherein the shutter time is established to be inversely proportional to the measurement moving pixel number.

14. The digital image processing apparatus of claim 10, wherein the shutter time is established to be inversely proportional to the file size or the image size.

15. The digital image processing apparatus of claim 10, wherein the file size or the image size is defined as a recording pixel number of a captured and stored image.

16. The digital image processing apparatus of claim 10, wherein the file size or the image size is defined as a recording pixel number of a captured and stored image, and the compensation coefficient is established to be inversely proportional to the recording pixel number.

17. The digital image processing apparatus of claim 10, wherein sensitivity is established to be inversely proportional to the shutter time.

* * * * *